United States Patent
Xiong et al.

(10) Patent No.: US 10,411,483 B2
(45) Date of Patent: Sep. 10, 2019

(54) ROBOT RECHARGING DOCK AND ROBOT RECHARGING SYSTEM

(71) Applicant: UBTECH Robotics Corp, Shenzhen (CN)

(72) Inventors: Youjun Xiong, Shenzhen (CN); Haiyue Yan, Shenzhen (CN)

(73) Assignee: UBTECH ROBOTICS CORP., Shenzhen (CN)

( * ) Notice: Subject to any disclaimer, the term of this patent is extended or adjusted under 35 U.S.C. 154(b) by 64 days.

(21) Appl. No.: 15/828,389

(22) Filed: Nov. 30, 2017

(65) Prior Publication Data

US 2019/0052101 A1    Feb. 14, 2019

(30) Foreign Application Priority Data

Aug. 14, 2017    (CN) .......................... 2017 1 0695867

(51) Int. Cl.
  *H02J 7/00*    (2006.01)

(52) U.S. Cl.
  CPC .......... *H02J 7/0029* (2013.01); *H02J 7/0027* (2013.01); *H02J 7/0036* (2013.01); *H02J 7/0042* (2013.01); *H02J 7/0088* (2013.01)

(58) Field of Classification Search
  CPC ....... H02J 7/0029; H02J 7/0042; H02J 7/0088
  USPC ....................................................... 320/107
  See application file for complete search history.

(56) References Cited

U.S. PATENT DOCUMENTS

| | | | | |
|---|---|---|---|---|
| 5,045,769 A | * | 9/1991 | Everett, Jr. ......... | G05D 1/0225 320/107 |
| 6,437,575 B1 | * | 8/2002 | Lin .................. | G01R 19/16538 324/428 |
| 6,764,373 B1 | * | 7/2004 | Osawa ................. | B25J 19/005 180/169 |
| 7,659,496 B2 | * | 2/2010 | Lin ........................ | G01J 1/32 250/205 |
| 7,719,229 B2 | * | 5/2010 | Kaneko ................ | B25J 19/005 320/113 |
| 9,573,701 B2 | * | 2/2017 | Beardsley ............. | B60L 53/37 |
| 9,874,875 B2 | * | 1/2018 | Suh ........................ | B25J 9/00 |
| 2011/0089891 A1 | * | 4/2011 | Pai ........................ | H02J 7/0044 320/107 |
| 2015/0286211 A1 | * | 10/2015 | Sticht .................... | B25J 9/1692 700/258 |
| 2017/0297445 A1 | * | 10/2017 | Zheng .................. | B64C 39/024 |
| 2018/0292837 A1 | * | 10/2018 | Chen .................... | H02J 7/0027 |

* cited by examiner

*Primary Examiner* — M Baye Diao

(57) ABSTRACT

The present disclosure relates to a recharging dock and a robot. The recharging dock may include: a recharging dock body and at least a pair of recharging contact pads configured on at least one side of the recharging dock body, at least one recharging switch circuit connecting to at least one recharging power supply respectively, and a sensing circuit. The sensing circuit is configured to turn on the recharging switch circuit upon detecting a magnetic component of a robot, and the recharging power supply may output a recharging voltage to the recharging contact pads. As such, the safety of the recharging dock of the robot may be improved.

14 Claims, 2 Drawing Sheets

ROBOT RECHARGING DOCK AND ROBOT RECHARGING SYSTEM

CROSS REFERENCE TO RELATED APPLICATIONS

This application claims priority to Chinese Patent Application No. 201710695867.7, filed Aug. 14, 2017, which is hereby incorporated by reference herein in its entirety.

BACKGROUND

1. Technical Field

The present disclosure relates to a robot-recharging field, and more particularly to a recharging dock and a robot.

2. Description of Related Art

Robot is an intelligent device configured to recharge automatically. Currently, most of the intelligent devices, such as sweeping robot, may conduct an automatic recharging process by performing infrared alignment. The robot may detect the recharging dock via sensors, and may conduct a recharging process by directly connecting to a positive and a negative contact pads. The positive and the negative contact pads of the conventional recharging method are charged and exposed. It will be dangerous when misusing, and especially for children.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 1:
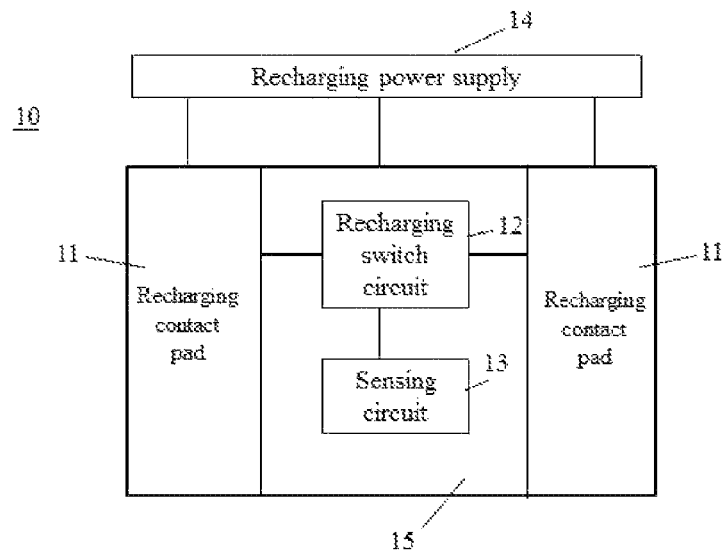
FIG. 1 is a schematic view of a recharging dock in accordance with one embodiment of the present disclosure.

Referring to FIG. 1, the present disclosure relates to a recharging dock 10, including: at least a pair of recharging contact pads 11, a recharging switch circuit 12, a sensing circuit 13 connected to the recharging switch circuit 12 in sequence, and a recharging power supply 14 connected to the recharging contact pads 11 through the recharging switch circuit 12.

When the sensing circuit 13 detects an external device approaching, the sensing circuit 13 is configured to turn on the recharging switch circuit 12, and the recharging power supply 14 outputs a recharging voltage to the recharging contact pads 11. When the sensing circuit 13 detects no external device, the sensing circuit 13 is configured to turn off the recharging switch circuit 12, and the recharging power supply 14 outputs no voltage to the recharging contact pads 11.

Figure 2:
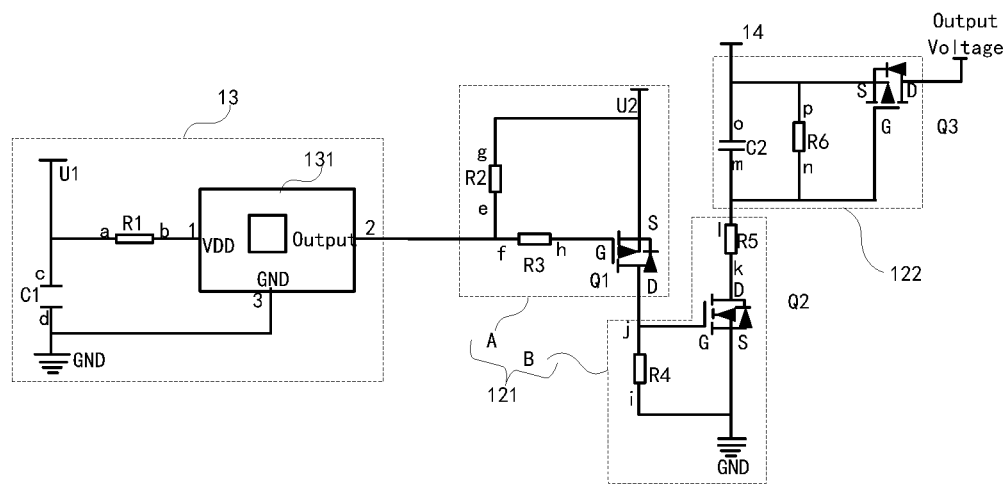
FIG. 2 is a schematic view of a sensing circuit and a switch-controlling circuit in accordance with one embodiment of the present disclosure.

As shown in FIG. 2, the sensing circuit 13 may include a first resistor R1, a first capacitor C1, and a sensor 131. In an example, the sensor 131 may be a Hall sensor.

Wherein a first end "a" of the first resistor R1 connects to a first power supply U1, and a second end "b" of the first resistor R1 connects to a first end 1 of the sensor 131. A first end "c" of the first capacitor C1 connects to the first power supply U1, and a second end "d" of the first capacitor C1 and a third end 3 of the sensor 131 are grounded. A second end 2 of the sensor 131 connects to the recharging switch circuit 12. The first power supply U1 may supply power to the sensor 131, and a voltage of the first power supply U1 may be 3V. The first capacitor C1 may be a filter capacitor. A capacitance of the first capacitor C1 may be 10 nF, and a rated voltage of the first capacitor may be 50 V. The first resistor R1 may be a current limiting resistor, and a resistance may be 100Ω. The first resistor R1 is configured to prevent a current passing through the sensor 131 from being overflow and protect the sensor 131 from being burned out.

Referring to FIG. 2, the recharging switch circuit 12 may include a switch-controlling circuit 121 and an output circuit 122.

Wherein a first end of the switch-controlling circuit 121 connects to the sensing circuit 13, and a second end of the switch-controlling circuit 121 connects to a first end of the output circuit 122. A second end of the output circuit 122 connects to the recharging power supply 14, and a third end of the output circuit 122 connects to the recharging contact pads 11.

When the sensing circuit 13 detects the external device approaching, the switch-controlling circuit 121 may turn on the output circuit 122, and the recharging power supply 14 outputs the recharging voltage to the recharging contact pads 11.

The switch-controlling circuit 121 may include a first switch-controlling circuit A and a second switch-controlling circuit B. Wherein the first switch-controlling circuit A may include a second resistor R2, a third resistor R3, and a first transistor Q1.

A first end "e" of the second resistor R2 and a first end "f" of the third resistor R3 respectively connect to the second end 2 of the sensor 131. A second end "g" of the second resistor R2 connects to a second power supply U2. A second end "h" of the third resistor R3 connects to a gate G of the first transistor Q1. A source S of the first transistor Q1 connects to the second power supply U2. A drain D of the first transistor Q1 connects to the second switch-controlling circuit B.

Wherein a resistance of the second resistor R2 may be 100 KΩ, and a resistance of the third resistor R3 may be 1 KΩ. The first transistor Q1 may be a P-channel field effect transistor (FET). Specifically, the first transistor Q1 may be a P-channel metal-oxide-semiconductor (MOS) transistor. The second resistor R2 and the third resistor R3 are pull-up resistors. The second resistor R2 and the third resistor R3 maintain the first transistor Q1 at a stable state, and prevent the first transistor Q1 to be at a high-resistance state. A voltage of the second power supply U2 may be 3V.

The second switch-controlling circuit B may include: a fourth resistor R4, a second transistor Q2, and a fifth resistor R5. Wherein a first end "i" of the fourth resistor R4 and a source S of the second transistor Q2 are grounded. A second end "j" of the fourth resistor R4 and a gate G of the second transistor Q2 connect to the drain D of the first transistor Q1. A drain D of the second transistor Q2 connects to a first end "k" of the fifth resistor R5. A second end "l" of the fifth resistor R5 connects to the output circuit 122.

The second transistor Q2 may be an N-channel FET. Specifically, the second transistor Q2 may be an N-channel MOS transistor. A resistance of the fifth resistor R5 may be 47 KΩ. A resistance of the fourth resistor R4 may be 10 KΩ. The fourth resistor R4 may be a pull-down resistor of the second transistor Q2 to maintain the second transistor Q2 at a stable-low-level state.

Referring to FIG. 2, the output circuit 122 may include a second capacitor C2, a sixth resistor R6, and a third transistor Q3.

A first end "m" of the second capacitor C2, a first end "n" of the sixth resistor R6, and a gate G of the third transistor Q3 connect to the second end "l" of the fifth resistor R5. A second end "o" of the second capacitor C2, a second end "p" of the sixth resistor R6, and a source S of the third transistor Q3 connect to the recharging power supply 14. A drain D of the third transistor Q3 connects to the recharging contact pads 11.

The third transistor Q3 may be a P-channel FET. Specifically, the third transistor Q3 may be a P-channel MOS transistor. A capacitance of the second capacitor C2 may be 100 nF and a rated voltage of the second capacitor C2 may be 50 V. A resistance of the sixth resistor R6 may be 47 KΩ. The second capacitor C2 and the sixth resistor R6 are the pull-up resistors. The second capacitor C2 and the sixth resistor R6 prevent the third transistor Q3 to be at the high-resistance state, and maintain the third transistor Q3 at the stable state.

The recharging dock 10 may include a recharging dock body 15, and the recharging contact pads 11 are configured on the recharging dock body 15.

Operation principles of the recharging, dock may include the following two scenarios.

1) The Hall sensor detects no external device.

The external device may be, but not limited to, a robot having a component cooperatively operating with the Hall sensor or may be other devices capable of recharging automatically. The external device of the present disclosure may be the robot capable of recharging automatically. When the Hall sensor detects no magnetic component of the robot, for example, a recharging connecter of the robot has not connected to the recharging dock, the recharging power supply may only have an input voltage and may not have an output voltage. That is, the recharging contact pads of the recharging connecter may have no recharging voltage. As such, the safety issue of the charged contact pads caused by misusing may be avoided.

2) The Hall sensor detects the external device approaching.

When the Hall sensor detects the magnetic component of the robot, for example, the robot approaching or connected to the positive and negative recharging contact pads of the recharging dock, the Hall sensor outputs a low voltage. The first transistor Q1 is turned on and outputs a high voltage to the second transistor. The second transistor is turned off and outputs a low voltage to turn on the third transistor Q3. Thus, the recharging power supply is conductive to the recharging dock, and the positive and the negative recharging contact pads of the recharging dock may output a voltage. When the conductive wheel of the robot connects to the positive and the negative recharging contact pads of the recharging dock, the robot may detect the voltage inputting to the conductive wheel, and the robot may start to recharge.

In view of the above, the sensing circuit is configured on the recharging dock to detect whether the external device is approaching, and to turn on or turn off the switch-controlling circuit, so as to control an output of the recharging power supply. As such, the safety of the recharging dock of the robot may be improved.

Figure 3:
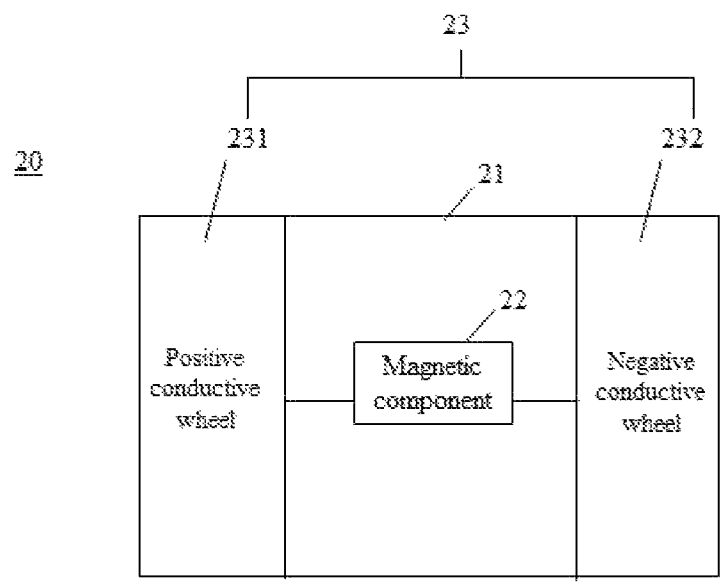
FIG. 3 a schematic view of a robot in accordance with one embodiment of the present disclosure.

Referring to FIG. 3, the present disclosure relates to the robot 20, including: a robot body 21, the magnetic component 22, and a recharging circuit 23.

Wherein the magnetic component 22 and the recharging circuit 23 are configured on the robot body 21. The magnetic component 22 is configured to cooperatively operate with the recharging dock as described above. Thus, a recharging process may be conducted on the recharging circuit 23.

In one example, the recharging circuit 23 may include a positive conductive wheel 231 and a negative conductive wheel 232. The magnetic component may be magnets or electromagnets. In another example, the magnetic component may be made of other magnetic material to guarantee the cooperative operation between the robot and the recharging dock.

In view of the above, the present disclosure relates to a recharging dock and a robot. The sensing circuit is configured on the recharging dock to detect whether the external device is approaching, and to turn on or turn off the switch-controlling circuit, so as to control the output of the recharging power supply. As such, the safety of the recharging dock of the robot may be improved.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A robot recharging dock, comprising:
   a recharging dock body;
   at least a pair of recharging contact pads configured on at least one side of the recharging dock body;
   at least one recharging switch circuit, a recharging power supply connected to the recharging contact pads through the at least one recharging switch circuit; and
   a sensing circuit connected to the at least one recharging switch circuit;
   wherein the sensing circuit is configured to turn on the recharging switch circuit upon detecting a magnetic component of a robot, so that the recharging power supply outputs a recharging voltage to the recharging contact pads;
   wherein the sensing circuit comprises:
   a first resistor, a first capacitor, and a sensor;
   wherein a first end of the first resistor connects to a first power supply, and a second end of the first resistor connects to a first end of the sensor;
   a first end of the first capacitor connects to the first power supply, and a second end of the first capacitor is grounded; and
   a second end of the sensor connects to the recharging switch circuit, and a third end of the sensor is grounded.

2. The robot recharging dock according to claim 1, wherein the recharging switch circuit comprises a switch-controlling circuit and an output circuit;
   a first end of the switch-controlling circuit connects to the sensing circuit, and a second end of the switch-controlling circuit connects to a first end of the output circuit; and
   a second end of the output circuit connects to the recharging power supply, and a third end of the output circuit connects to the recharging contact pads.

3. The robot recharging dock according to claim 2, wherein the switch-controlling circuit further comprises a first switch-controlling circuit and a second switch-controlling circuit;
- the first switch-controlling circuit comprises a second resistor, a third resistor, and a first transistor;
- a first end of the second resistor and a first end of the third resistor respectively connects to the second end of the sensing circuit, a second end of the second resistor connects to a second power supply;
- a second end of the third resistor connects to a gate of the first transistor, a source of the first transistor connects to the second power supply, and a drain of the first transistor connects to the second switch-controlling circuit;
- the second switch-controlling circuit comprises a fourth resistor, a second transistor, and a fifth resistor;
- a first end of the fourth resistor and a source of the second transistor are grounded;
- a second end of the fourth resistor and a gate of the second transistor connect to the drain of the first transistor; and
- a drain of the second transistor connects to a first end of the fifth resistor, and a second end of the fifth resistor connects to the output circuit.

4. The robot recharging dock according to claim 3, wherein the output circuit comprises:
- a second capacitor, a sixth resistor, and a third transistor;
- a first end of the second capacitor, a first end of the sixth resistor, and a gate of the third transistor connect to the second end of the fifth resistor;
- a second end of the second capacitor, a second end of the sixth resistor, and a source of the third transistor connect to a recharging power supply; and
- a drain of the third transistor connects to the recharging contact pads.

5. The robot recharging dock according to claim 4, wherein the first transistor, the second transistor, and the third transistor are field effect transistors (FETs).

6. The robot recharging dock according to claim 5, wherein the first transistor and the third transistor are P-channel FETs, and the second transistor is an N-channel FET.

7. The robot recharging dock according to claim 1, wherein the sensor is a Hall sensor.

8. A robot recharging system, comprising:
- a robot, and a recharging dock configured to charge the robot;
- the recharging dock comprising:
- a recharging dock body;
- at least a pair of recharging contact pads is configured on at least one side of the recharging dock body;
- at least one recharging switch circuit, a recharging power supply connected to the recharging contact pads through the at least one recharging switch circuit; and
- a sensing circuit connected to the at least one recharging switch circuit;
- wherein the sensing circuit is configured to turn on the recharging switch circuit upon detecting a magnetic component of the robot, so that the recharging power supply outputs a recharging voltage to the recharging contact pads;
- wherein the sensing circuit comprises:
- a first resistor, a first capacitor, and a sensor;
- wherein a first end of the first resistor connects to a first power supply, and a second end of the first resistor connects to a first end of the sensor;
- a first end of the first capacitor connects to the first power supply, and a second end of the first capacitor is grounded; and
- a second end of the sensor connects to the recharging switch circuit, and a third end of the sensor is grounded.

9. The robot recharging system according to claim 8, wherein the recharging switch circuit comprises a switch-controlling circuit and an output circuit;
- a first end of the switch-controlling circuit connects to the sensing circuit, and a second end of the switch-controlling circuit connects to a first end of the output circuit; and
- a second end of the output circuit connects to the recharging power supply, and a third end of the output circuit connects to the recharging contact pads.

10. The robot recharging system according to claim 9, wherein the switch-controlling circuit further comprises a first switch-controlling circuit and a second switch-controlling circuit;
- the first switch-controlling circuit comprises a second resistor, a third resistor, and a first transistor;
- a first end of the second resistor and a first end of the third resistor respectively connects to the second end of the sensing circuit, a second end of the second resistor connects to a second power supply;
- a second end of the third resistor connects to a gate of the first transistor, a source of the first transistor connects to the second power supply, and a drain of the first transistor connects to the second switch-controlling circuit;
- the second switch-controlling circuit comprises a fourth resistor, a second transistor, and a fifth resistor;
- a first end of the fourth resistor and a source of the second transistor are grounded;
- a second end of the fourth resistor and a gate of the second transistor connect to the drain of the first transistor; and
- a drain of the second transistor connects to a first end of the fifth resistor, and a second end of the fifth resistor connects to the output circuit.

11. The robot recharging system according to claim 10, wherein the output circuit comprises:
- a second capacitor, a sixth resistor, and a third transistor;
- a first end of the second capacitor, a first end of the sixth resistor, and a gate of the third transistor connect to the second end of the fifth resistor;
- a second end of the second capacitor, a second end of the sixth resistor, and a source of the third transistor connect to a recharging power supply; and
- a drain of the third transistor connects to the recharging contact pads.

12. The robot recharging system according to claim 11, wherein the first transistor, the second transistor, and the third transistor are FETs.

13. The robot recharging system according to claim 12, wherein the first transistor and the third transistor are P-channel FETs, and the second transistor is an N-channel FET.

14. The robot recharging system according to claim 8, wherein the sensor is a Hall sensor.

\* \* \* \* \*